United States Patent Office 3,202,524
Patented Aug. 24, 1965

3,202,524
MANUFACTURE OF TITANIUM DIOXIDE
James Thomson Richmond, Grimsby, England, assignor to Laporte Titanium Limited, London, England, a British company
No Drawing. Filed Nov. 10, 1961, Ser. No. 151,433
Claims priority, application Great Britain, Nov. 17, 1960, 39,596/60
14 Claims. (Cl. 106—300)

This invention relates to the manufacture of titanium dioxide.

The invention provides a continuous process for the manufacture of titanium dioxide, which comprises calcining at a temperature of 900° C.–1300° C. mineral rutile, or leucoxene or a concentrate prepared by reacting a titanium-dioxide-containing material with hydrochloric acid or hydrogen chloride gas, or a mixture of more than one of these titanium-containing substances, in admixture with magnesium oxide, or calcium oxide, or zinc oxide, or a mixture of more than one of these metal oxides, the molar ratio of the metal oxide or oxides to the titanium dioxide content of the titanium-containing substance or substances being at least 2:1, to form magnesium titanate, or calcium titanate, or zinc titanate or a mixture of these titanates, treating the titanate or titanates with hydrochloric acid, heating to precipitate titanium dioxide, separating the precipitated titanium dioxide, neutralising the remaining solution by incorporating with it magnesium oxide, or calcium oxide, or zinc oxide, or a mixture of these metal oxides, corresponding to the titanate or mixture of titanates formed, thermally decomposing the neutralised solution to give steam, hydrogen chloride and the said metal oxide or oxides and recycling at least the greater part of the hydrogen chloride to treat a further quantity of the titanate or mixture of titanates and/or, when the titanium-containing substance is a concentrate prepared by reacting a titanium-dioxide-containing material with hydrochloric acid or hydrogen chloride gas, for preparing a further quantity of the said concentrate.

The word "titanate" is used throughout the specification to mean the ortho-titanate when referring to the magnesium and zinc compounds, and to mean the meta-titanate when the calcium compound is referred to. All these "titanates" contain an excess of the metal oxide. The excess metal oxide probably remains as free oxide intimately mixed with the ortho-titanate or meta-titanate.

The titanium-containing substances specified are difficult or impossible to attack satisfactorily with sulphuric acid and the process of the invention enables the titanium content of these substances to be obtained as titanium dioxide suitable for use as a pigment and for other purposes without resort to direct chlorination of the substances.

The steam may be recycled with the hydrogen chloride and these substances may be condensed to form hydrochloric acid before they are incorporated with the further titanate or mixture of titanates. Advantageously, at least a part of the oxide or oxides formed by the thermal decomposition is used to neutralise further solution and/or for the calcination in admixture with further of the said titanium-containing substance or substances to form the corresponding titanate or titanates. Preferably, the said solution is concentrated before it is thermally decomposed. Any liquid used to wash the precipitated titanium dioxide may be treated in like manner to the said solution. Thus, a substantial proportion of both the hydrochloric acid and the magnesium, calcium, or zinc oxides used can be recovered and used over again.

Advantageously, the molar ratio of the metal oxide or oxides to the titanium dioxide content of the titanium-containing substance or substances is greater than 2:1. For economic reasons, it is undesirable to use a large excess of the metal oxide or oxides and, accordingly, the said molar ratio preferably does not exceed 2.25:1.

If desired, magnesium oxide, calcium oxide, zinc oxide or a mixture thereof may be formed in situ by incorporating with the said titanium-containing substance a compound, for example, the carbonate of magnesium, calcium or zinc or a mixture of these carbonates, that decomposes during calcination to give the respective oxide or oxides. Preferably, there is incorporated with the said titanium-containing substance or substances and the metal oxide or oxides before calcination to form the titanate or titanates a quantity of hydrochloric acid, magnesium chloride, zinc chloride or calcium chloride not exceeding 2% based on the weight of the said substance or substances. There may also be incorporated with the said substance or substances a quantity of sodium chloride within the range of from 5 to 10% based on the weight of the said substance or substances. This is especially advantageous when magnesium chloride is incorporated with the substance or substances. If the said substance contains ferric iron, there may be incorporated with the said substance before calcination to form the titanate a quantity of reducing agent, for example, carbon, not exceeding 10% by weight of the said substance to reduce substantially all the ferric iron to the ferrous state during the calcination.

The invention also provides a modification of the process for the manufacture of titanium dioxide described above, which comprises treating an aqueous suspension of leucoxene or of a concentrate prepared by reacting a titanium-dioxide-containing material with hydrochloric acid or hydrogen chloride gas, or of a mixture of these two titanium-containing substances, with calcium oxide, the molar ratio of the calcium oxide to the titanium dioxide content of the titanium-containing substance or substances being at least 2:1, at such a temperature and pressure that calcium titanate is formed, treating this calcium titanate with hydrochloric acid and heating to precipitate titanium dioxide, separating the precipitated titanium dioxide, neutralising the remaining solution by incorporating with it calcium oxide, thermally decomposing this neutralised solution to give steam, hydrogen chloride and calcium oxide, and recycling at least the greater part of the hydrogen chloride to treat a further quantity of the titanate and/or, when the titanium-containing substance is a concentrate prepared by reacting a titanium-dioxide-containing material with hydrochloric acid or hydrogen chloride gas, for preparing a further quantity of the said concentrate.

The hydrochloric acid used to treat the titanate may be formed in situ by incorporating water with the titanate and dissolving hydrogen chloride in the water. In all cases it is preferred to crush and grind the titanate before treatment with hydrochloric acid. The titanium dioxide may be precipitated by boiling the liquid while the titanate is undergoing treatment. When the titanium dioxide is precipitated, iron and other impurities remain in solution. When the precipitated titanium dioxide has been separated from the solution by filtration and then calcined, it is a pure, but non-pigmentary, form having the rutile crystallographic structure and is suitable for use, for example, in glass and vitreous enamels.

Instead of precipitating the titanium dioxide by boiling the liquid while the titanate or mixture of titanates is undergoing treatment, the temperature of the liquid during the treatment may be kept sufficiently low to ensure that substantially no titanium dioxide is precipitated and the resulting solution may thereafter be boiled to hydrolyse the solution and precipitate titanium dioxide. Advantageously, the resulting solution is filtered before hydrolysis. When the titanium dioxide is not precipitated by boiling during the treatment of the titanate or titanates with hydrochloric acid, this treatment is advantageously carried out at a temperature within the range of from 46 to 65° C.

When the titanium dioxide is precipitated by hydrolysis of the solution resulting from the treatment with hydrochloric acid and not by boiling the liquid during the treatment, it is possible to obtain, as a final product, pigmentary titanium dioxide that may be in either the anatase or the rutile form.

If it is desired to obtain anatase titanium dioxide a rutile retarding agent may be incorporated with the solution before hydrolysis. If the precipitated titanium dioxide is calcined, such an agent may also be incorporated with the precipitated titanium dioxide prior to the calcination. The rutile retarding agent is preferably phosphoric acid and the quantity of the agent used is preferably within the range of from 0.5% to 1% (calculated as $P_2O_5$ and based on the weight of the titanium dioxide in the solution or precipitate). Calcium phosphate or sodium phosphate may also be employed as a rutile retarding agent, the preferred quantity used being as for phosphoric acid.

If it is desired to obtain rutile titanium dioxide, a rutile seeding agent may be incorporated with the solution before hydrolysis, and/or a rutile promoting agent (for example, zinc oxide) may be incorporated with the precipitated titanium dioxide before it is calcined. A small quantity of zinc oxide may also be incorporated with the precipitated titanium dioxide before calcination to serve as a conditioning agent for rutile titanium dioxide.

A small quantity of potassium sulphate may be incorporated with the precipitated titanium dioxide before calcination to serve as a texture modifier, the use of this compound being possible when either anatase or rutile titanium dioxide is desired.

A hydrolysis seed may be prepared by isolating from 0.2 to 20% by weight (preferably from 3 to 12% and conveniently 10% by weight) of the solution obtained from the treatment of the titanate or titanates, diluting the isolated solution, and then heating it to hydrolyse it and form a colloidal suspension in a manner known per se. This colloidal suspension is returned to the remainder of the reduced solution and the whole boiled to precipitate titanium dioxide.

Preferably, before the solution obtained from the treatment of the titanate or titanates is boiled, there is incorporated with the solution a sufficient quantity of a reducing agent, for example, metallic aluminum or zinc, to reduce about 1% of the titanium present to the trivalent state and to reduce substantially the whole of any ferric iron present to the ferrous state. A hydrolysis seed may be prepared as described above, but the portion isolated must be taken from the reduced solution.

The following examples illustrate the invention, the parts and percentages being by weight:

*Example 1*

116.8 parts of mineral rutile ground to a particle size of minus 325 mesh and containing 97% $TiO_2$ were mixed with 127.1 parts of MgO (containing 2.5% of $TiO_2$) so that the molar ratio $MgO:TiO_2$ was 2.14:1. 2.4 parts of hydrochloric acid were added in the form of an aqueous solution of 36% strength. After mixing, the whole was calcined at a temperature of 1,300° C. for a total time (including the heating-up period) for 5 hours. The magnesium titanate thus produced was cooled, crushed, and ground to a particle size of minus 325 mesh, and then leached with 425.7 parts of hydrochloric acid (added as 1,182 parts of 36% strength hydrochloric acid) for 2 hours at a temperature of 45° C., the mixture being agitated throughout the period of the dissolution.

The solution containing a small residue was filtered and the residue washed with 113 parts of 36% strength hydrochloric acid. The filtrate and washings were combined and treated with 22.5 parts of MgO to neutralise the extra acid added by the use of the acid washings from the previous stage of the process.

The small proportion of ferric iron in the solution was reduced by the addition of 0.3 part of aluminum metal, this quantity being sufficient to reduce also about 1% of the titanium present to the trivalent state.

A hydrolysis seed was formed by separating 10% by volume of the reduced solution from the main bulk and diluting this portion so as to have titanium concentration of approximately 20 grams per litre calculated as $TiO_2$. This diluted portion was then heated to a temperature of 82° C. in ten minutes and maintained at that temperature for a further 5 minutes.

The hydrolysis seed was then returned to the main bulk of the solution and the whole raised to the boil in 30 minutes, and boiled under reflux for 30 minutes to precipitate $TiO_2$. The yield was 95%.

The precipitate was then filtered and washed with a 0.05 N HCl solution, care being taken to avoid excess washings since this would probably have induced peptisation. It should be pointed out, however, that, if peptisation had occurred, the precipitate could have been reflocculated, for example, by adding 2 grams of sulphuric acid to each litre of the wash water. After washing, 0.2% $K_2SO_4$ and 0.5% ZnO (based on the weight of the precipitate) were added as a texture modifier and a rutile promoting agent respectively and the precipitate was calcined at a temperature of 840° C. for a total time (including the heating-up period) of 1½ hours.

A rutile pigment of good colour and high tinting strength (Reynolds 1600) was obtained.

The combined filtrate and strong washings from the hydrolysis operation amounted to 1612 parts and contained 161.5 parts HCl, 295.2 parts $MgCl_2$, and 13.5 parts $TiCl_4$. This solution was neutralised at room temperature with 94.4 parts of MgO (containing 2.5% $TiO_2$) and the liquor was then evaporated to yield a hot solution containing 39.2% $MgCl_2$. This latter solution, which contained 500 parts of $MgCl_2$, was sprayed at a temperature of 110° C. into the top of a refractory lined tower wherein there was flowing a counter-current stream of hot gases obtained by the combustion of oil in the lower portion of the tower. The temperature in this lower portion was 900° C. whereas the temperature at the top of the tower was approximately 200° C. The solution decomposed to yield 376 parts of HCl and 206 parts of MgO, which represented an overall recovery of 80.7% of the HCl and 86.5% of the MgO. The MgO was collected at the bottom of the tower as a solid and 92% of it was recycled, which represented nearly 80% of the total quantity of MgO required to treat a further 116.8 parts of mineral rutile. The steam and hydrochloric acid gas were condensed to give HCl of approximately 36% strength, of which 85% was reused in the leaching stage. One suitable apparatus for conducting the thermal decomposition is that known as the Aman reactor.

It will be seen that the $TiO_2$ precipitated during the hydrolysis was readily converted to rutile at a relatively low temperature.

The process gave rise to little or no effluent because the bulk of the hydrochloric acid was recovered and recycled. As mentioned, the magnesium oxide that was recovered was recycled to the titanate formation and/or the neutralisation steps. This oxide contained a small proportion of impurities including iron oxide coming from the mineral rutile originally employed. Thus from time to time a minor proportion (for example, about 20%, but the proportion can vary from 15% to 50%) of the recovered oxide would need to be removed and replaced by fresh oxide in order to reduce or eliminate build-up of impurities in the system.

Example 2

Instead of using mineral rutile as starting material to form the titanate, there was used a titanium dioxide concentrate prepared from ilmenite. An ilmenite ore containing 46.3% $TiO_2$, 41.7% FeO and 8.6% $Fe_2O_3$ was ground to a particle size of minus 200 mesh and mixed with a quantity of hydrochloric acid of 21% strength, which was equivalent to 32% in excess of that required to react stoichiometrically with the ferric and ferrous oxides to form ferric and ferrous chlorides respectively. The mixture was digested by boiling for 5 hours under reflux to dissolved the major part of the iron oxides and to precipitate a titanium concentrate in finely divided form. The latter was filtered, washed and dried at a temperature of 130° C. A portion of this concentrate was further dried at 500° C., and analysed. It contained 90% $TiO_2$ and 7% $Fe_2O_3$, the balance being mainly silica.

The remainder of the material, which was dried at a temperature of 130° C., was dry mixed with MgO in the molar proportion of 2.15 MgO:1 $TiO_2$ and calcined at a temperature of 900° C. for a total time (including the heating-up period) of 3 hours to produce magnesium titanate. The filtrate and strong washings resulting from the decomposition of the ilmenite and containing ferrous and ferric chlorides were mixed together and the free acid was neutralised with magnesium oxide. The resulting neutralised solution contained magnesium, ferrous, and ferric chlorides equivalent to 88% of the hydrochloric acid used for the treatment of the ilmenite. The resulting soltuion of iron and magnesium chlorides was evaporated to remove excess water and the residue decomposed by feeding to a rotating hearth furance of the Herreshoff type which was heated to a temperature of 900° C. by means of auxiliary oil burners. Mixed iron and magnesium oxide was recovered (part of which was recycled for the neutralisation of fresh filtrates) and the hydrochloric acid gas evolved was absorbed by conventional means to give a solution of 21% strength which was recycled to the ilmenite digestion stage. 98% of the magnesium oxide added to neutralise the hydrochloric acid in the solution of ferrous and ferric chlorides obtained from the ilmenite concentration process was recovered after thermal decomposition of that solution, and the hydrogen chloride gas obtained from the decomposition was equivalent to 83% of the acid used for the treatment of the ilmenite.

The magnesium titanate was treated with hydrochloric acid to produce titanium dioxide in a manner closely similar to that described in Example 1.

Example 3

100 parts of mineral leucoxene, which contained 77% $TiO_2$ and 9.3% $Fe_2O_3$, the balance being mainly silica and zircon dioxide together with minor amounts of oxides of chromium and vanadium, 173 parts of zinc oxide and 3 parts of carbon, were intimately mixed to form a slurry by wet grinding to a particle size of minus 300 mesh B.S.S. The molecular ratio $TiO_2$:ZnO in the slurry was 1:2.225. 1% of zinc chloride (based on the weight of leucoxene) was mixed with the slurry and the resultant mixture was dried at a temperature of 100° C. The dried mass was then calcined at a temperature of 940° C. for a total time (including the heating-up period) of 3 hours.

The calcined product was ground to a particle size of minus 200 mesh B.S.S. and treated with an 18% strength hydrochloric acid for a period of 6 hours under reflux conditions. The quantity of the hydrochloric acid was 20% in excess of that required to convert the zinc oxide and the ferrous oxide present in the calcined product into zinc and ferrous chlorides respectively. During the treatment with the hydrochloric acid titanium dioxide was precipitated. After the acid treatment was completed, the titanium dioxide was separated from the solution of zinc and ferrous chlorides and salts of chromium and vanadium in hydrochloric acid by filtration. The titanium dioxide was then freed from any residual zinc and ferrous chlorides, salts of chromium and vanadium and hydrochloric acid by washing, and then calcined at a temperature of 850° C. for a total time (including the heating-up period) of 2 hours. The calcined product obtained after this second calcination was a high quality titanium dioxide (containing zircon dioxide and silica) suitable for use as a vitreous enamel grade titanium dioxide. A very small quantity of carbon that remained after the first calcination was burnt off during this calcination.

The filtrate and strong washings obtained after the separation of the titanium dioxide contained zinc and iron chlorides, and hydrochloric acid, which were together equivalent to 84% of the hydrochloric acid used to treat the titanate. The filtrate and strong washings were neutralised by adding zinc oxide, and, after partial evaporation, were thermally decomposed to form steam, hydrogen chloride, zinc oxide, and ferrous oxide, in a manner similar to that described in Example 2. The hydrogen chloride obtained after this decomposition was equivalent to 64% of the hydrochloric acid used to treat the titanate. The difference between the figures of 84% and 64% was caused by incomplete decomposition of the zinc chloride present in the solution that was thermally decomposed. The hydrogen chloride gas was dissolved in water and recycled to treat further titanate.

Example 4

Mineral rutile containing 96.5% $TiO_2$ was ground to a particle size of less than 325 mesh B.S.S. and mixed with magnesium oxide so that the molar ratio of MgO:$TiO_2$ was 2.12:1.

Hydrogen chloride was then added to the mixture of rutile and magnesium oxide in the form of an aqueous solution of 36% strength, the relative proportions being 1.75 parts of hydrogen chloride to 100 parts of the said mixture. The whole was thoroughly mixed and then calcined at a temperature of 1,300° C. for a total time (including the heating-up period) of 5½ hours.

The magnesium titanate thus produced was cooled, crushed, and ground to a particle size of less than 325 mesh B.S.S. and then leached with 36% strength hydrochloric acid. The leaching operation was carried out at a temperature of 50° C. for three hours, and the mixture was agitated throughout the period of the dissolution.

The resulting solution was filtered to remove a small amount of undissolved matter which was present. The residue was washed with a small quantity of 36% strength hydrochloric acid, and the filtrate and washings were combined, and a further quantity of magnesium oxide was added to neutralise the excess acid. The resulting solution had a titanium concentration of 80 grams per litre calculated as $TiO_2$.

8% by volume of the solution was removed from the main bulk and diluted to a titanium concentration of 20 grams per litre calculated as $TiO_2$. A hydrolysis seed was then prepared by heating the diluted portion to a temperature of 85° C. over a period of ten minutes, and maintaining it at that temperature for a further five minutes.

The hydrolysis seed was then returned to the main bulk of the solution to which had been added a quantity of phosphoric acid equivalent to 0.8% $P_2O_5$ based on the total titanium content (calculated as $TiO_2$) of the main bulk of the solution together with the hydrolysis seed. The whole was then raised to the boil in one hour and then boiled under reflux for thirty minutes to precipitate titanium dioxide. The yield was 96%.

The precipitate was then filtered and washed with a 0.05 N HCl solution containing 2 grams per litre of sulphuric acid to prevent peptisation.

After washing, 0.3% of potassium sulphate (the percentage being calculated on the weight of titanium dioxide in the precipitate) was added to the precipitate as a texture modifier and the precipitate was then calcined at a temperature of 920° C. for a total time (including the heating-up period) of 1½ hours. Substantially the whole of the resulting pigment was in the antase crystalline form, had a good colour and had a tinting strength of 1200 (Reynolds scale).

The filtrate from the hydrolysis operation was neutralised with magnesium oxide and the liquor was evaporated to give a hot solution containing 39.5% of $MgCl_2$. This solution was sprayed at a temperature of 110° C. into the top of a refractory lined tower wherein there was flowing a counter-current stream of hot gases obtained by the combustion of oil in the lower portion of the tower, the temperature in this lower portion was 900° C., whereas the temperature at the top of the tower was approximately 200° C. The solution was decomposed to yield steam, hydrogen chloride and magnesium oxide. The overall recovery of hydrogen chloride was 81%, and of magnesium oxide was 89%. The magnesium oxide was collected at the bottom of the tower as a fine powder which was then recycled for the preparation of more magnesium titanate. The steam and hydrogen chloride gas were condensed to give hydrochloric acid of approximately 36% strength, which was reused in the leaching stage.

I claim:
1. A continuous process for the manufacture of titanium dioxide from at least one titanium-containing substance selected from the group consisting of mineral rutile, leucoxene and a concentrate prepared by reacting a titanium dioxide-containing material with a substance selected from the group consisting of hydrochloric acid and hydrogen chloride gas, which comprises performing the following process steps:
   (a) incorporating at least one metal oxide selected from the group consisting of magnesium oxide, calcium oxide and zinc oxide with the titanium-containing substance in a quantity such that the molar ratio of the metal oxide to the titanium dioxide content of the titanium-containing substance is at least 2:1,
   (b) calcining the mixture of metal oxide and titanium-containing substance at a temperature within the range of from 900° C. to 1,300° C. to form at least one metal titanate,
   (c) dissolving the metal titanate in hydrochloric acid to form a solution,
   (d) heating to precipitate titanium dioxide,
   (e) separating the precipitated titanium dioxide from the solution,
   (f) neutralising the remaining solution by incorporating therewith at least one metal oxide corresponding to the metal titanate formed in process step (b),
   (g) thermally decomposing the neutralised solution at a temperature within the range of from 200° C. to 900° C. to give steam, hydrogen chloride and the said metal oxide,
   (h) recycling at least the greater part of the hydrogen chloride formed to process step (c).

2. A continuous process as claimed in claim 1, wherein process step (a) comprises incorporating at least one metal-containing substance that decomposes during process step (b) to yield at least one metal oxide selected from the group consisting of magnesium oxide, calcium oxide and zinc oxide with the titanium-containing substance in a quantity such that the molar oxide content of the metal-containing substance to the titanium dioxide content of the titanium-containing substance is at least 2:1.

3. A continuous process as claimed in claim 1, wherein a chloride selected from the group consisting of hydrochloric acid, magnesium chloride, zinc chloride and calcium chloride is incorporated with the mixture of metal oxide and titanium-containing substance formed in process step (a) in a quantity not exceeding 2% based on the weight of the said titanium-containing substance.

4. A continuous process as claimed in claim 3, wherein a quantity of sodium chloride within the range of from 5 to 10% based on the weight of the said titanium-containing substance is also incorporated with the mixture of metal oxide and titanium-containing substance formed in process step (a).

5. A continuous process as claimed in claim 1, wherein process steps (c) and (d) are carried out simultaneously by boiling the metal titanate formed in process step (b) in admixture with hydrochloric acid.

6. A continuous process as claimed in claim 1, wherein the molar ratio of the metal oxide to the titanium dioxide content of the titanium-containing substance in the mixture formed in process step (a) does not exceed 2.25:1.

7. A continuous process for the manufacture of titanium dioxide from at least one titanium-containing substance selected from the group consisting of mineral rutile, leucoxene and a concentrate prepared by reacting a titanium dioxide-containing material with a substance selected from the group consisting of hydrochloric acid and hydrogen chloride gas, which comprises performing the following process steps:
   (a) incorporating at least one metal oxide selected from the group consisting of magnesium oxide, calcium oxide and zinc oxide with the titanium-containing substance in a quantity such that the molar ratio of the metal oxide to the titanium dioxide content of the titanium-containing substance is at least 2:1,
   (b) calcining the mixture of metal oxide and titanium-containing substance at a temperature within the range of from 900° C. to 1,300° C. to form at least one metal titanate,
   (c) dissolving the metal titanate with hydrochloric acid at a temperature within the range of from 45° C. to 65° C. to form a solution,
   (d) boiling the solution formed in process step (c) to precipitate titanium dioxide,
   (e) separating the precipitated titanium dioxide from the solution,
   (f) neutralising the remaining solution by incorporating therewith at least one metal oxide corresponding to the metal titanate formed in process step (b),
   (g) thermally decomposing the neutralised solution at a temperature within the range of from 200° C. to 900° C. to give steam, hydrogen chloride and the said metal oxide,
   (h) recycling at least the greater part of the hydrogen chloride formed to process step (c).

8. A continuous process as claimed in claim 7, wherein, after process step (c) and before process step (d), there is incorporated with the solution formed in process step (c) a sufficient quantity of a reducing agent to reduce about 1% of the titanium present to the trivalent state and to reduce substantially the whole of any ferric iron present to the ferrous state.

9. A continuous process as claimed in claim 7, wherein from 0.2 to 20% by weight of the solution formed in process step (c) is isolated, diluted, and heated to hydrolyse it and to form a colloidal suspension of titanium dioxide, and the colloidal suspension is returned to the remainder of the said solution.

10. A continuous process as claimed 8, wherein from 0.2 to 20% by weight of the said reduced solution is isolated, diluted and heated to hydrolyse it and to form a colloidal suspension of titanium dioxide, and the colloidal suspension is returned to the remainder of the reduced solution before process step (d) is carried out.

11. A continuous process for the manufacture of titanium dioxide from a titanium-containing substance which also contains ferric iron, which comprises performing the following process steps:

(a) forming a mixture of at least one metal oxide selected from the group consisting of magnesium oxide, calcium oxide and zinc oxide, together with the titanium-containing substance and a quantity of a reducing agent not exceeding 10% by weight of the said titanium-containing substance, the molar ratio of the metal oxide to the titanium dioxide content of the titanium-containing substance being at least 2:1, (b) calcining the said mixture at a temperature within the range of from 900° C. to 1,300° C. to form at least one metal titanate, (c) dissolving the metal titanate with hydrochloric acid to form a solution, (d) heating to precipitate titanium dioxide, (e) separating the precipitated titanium dioxide from the solution, (f) neutralising the remaining solution by incorporating therewith at least one metal oxide corresponding to the metal titanate formed in process step (b), (g) thermally decomposing the neutralised solution at a temperature within the range of from 200° C. to 900° C. to give steam, hydrogen chloride and the said metal oxide.

(h) recycling at least the greater part of the hydrogen chloride formed to process step (c).

12. A continuous process for the manufacture of titanium dioxide from at least one titanium-containing substance selected from the group consisting of mineral rutile, leucoxene and a concentrate prepared by reacting a titanium dioxide-containing material with a substance selected from the group consisting of hydrochloric acid and hydrogen chloride gas, which comprises performing the following process steps:

(a) incorporating at least one metal oxide selected from the group consisting of magnesium oxide, calcium oxide and zinc oxide with the titanium-containing substance in a quantity such that the molar ratio of the metal oxide to the titanium dioxide content of the titanium-containing substance is at least 2:1, (b) calcining the mixture of metal oxide and titanium-containing substance at a temperature within the range of from 900° C. to 1,300° C. to form at least one metal titanate.

(c) treating the metal titanate with hydrochloric acid, (d) heating to precipitate titanium dioxide, (e) separating the precipitated titanium dioxide from the solution, (f) neutralising the remaining solution by incorporating therewith at least one metal oxide corresponding to the metal titanate formed in process step (b), (g) thermally decomposing the neutralised solution at a temperature within the range of from 200° C. to 900° C. to give steam, hydrogen chloride and the said metal oxide, (h) recycling at least the greater part of the hydrogen chloride formed to process step (c), (i) recycling at least a part of the metal oxide formed in process step (g) to at least one of the process steps (a) and (f).

13. A continuous process for the manufacture of titanium dioxide, which comprises performing the following process steps:

(a) reacting a titanium dioxide-containing material with a substance selected from the group consisting of hydrochloric acid and hydrogen chloride gas to form a concentrate, (b) incorporating at least one metal oxide selected from the group consisting of magnesium oxide, calcium oxide and zinc oxide with a titanium-containing substance which consists at least in part of the concentrate prepared in process step (a), the molar ratio of the metal oxide to the titanium dioxide content of the titanium-containing substance being at least 2:1, (c) calcining the mixture of metal oxide and titanium-containing substance at a temperature within the range of from 900° C. to 1,300° C. to form at least one metal titanate, (d) dissolving the metal titanate with hydrochloric acid to form a solution, (e) heating to precipitate titanium dioxide, (f) separating the precipitated titanium dioxide from the solution, (g) neutralising the remaining solution by incorporating therewith at least one metal oxide corresponding to the metal titanate formed in process step (c), (h) thermally decomposing the neutralised solution at a temperature within the range of from 200° C. to 900° C. to give steam, hydrogen chloride and the said metal oxide, (i) recycling at least the greater part of the hydrogen chloride formed to process step (a).

14. A continuous process for the manufacture of titanium dioxide from a titanium-containing substance selected from the group consisting of mineral rutile, leucoxene and a concentrate prepared by reacting a titanium dioxide-containing material with a substance selected from the group consisting of hydrochloric acid to hydrogen chloride gas, which comprises performing the following process steps:

(a) forming an aqueous suspension of at least one of the said titanium-containing substances, (b) incorporating calcium oxide with the aqueous suspension to form a mixture in which the molar ratio of the calcium oxide to the titanium dioxide content of the titanium-containing substance is at least 2:1, (c) heating the said mixture under pressure to form calcium titanate, (d) dissolving the calcium titanate formed with hydrochloric acid to form a solution, (e) heating to precipitate titanium dioxide, (f) separating the precipitated titanium dioxide from the solution, (g) neutralising the remaining solution by incorporating therewith calcium oxide, (h) thermally decomposing the neutralised solution at a temperature within the range of from 200° C. to 900° C. to give steam, hydrogen chloride and calcium oxide, (i) recycling at least the greater part of the hydrogen chloride formed to process step (d).

References Cited by the Examiner

UNITED STATES PATENTS

| | | | |
|---|---|---|---|
| 2,088,913 | 8/37 | Llewellyn | 23—202 |
| 2,278,709 | 4/42 | Moran | 23—202 |
| 2,368,591 | 1/45 | Dahlstrom | 23—202 |
| 2,441,856 | 5/48 | Turner et al. | 23—202 |
| 2,507,729 | 5/50 | McKinney | 23—202 |
| 2,537,229 | 1/51 | McLaren | 23—202 |
| 2,589,964 | 3/52 | Richmond et al. | 23—202 |

FOREIGN PATENTS 553,136   5/43   Great Britain.

TOBIAS E. LEVOW, *Primary Examiner.*

JOHN R. SPECK, *Examiner.*